No. 791,886. PATENTED JUNE 6, 1905.
A. C. EASTWOOD.
CONTROLLER FOR ELECTRIC MOTORS.
APPLICATION FILED SEPT. 16, 1904.

3 SHEETS—SHEET 3.

Witnesses:
Titus H. Froids.
Wesley H. Reel.

Inventor:
Arthur C. Eastwood,
by his Attorneys,
Howson & Howson

No. 791,886.                                        Patented June 6, 1905.

UNITED STATES PATENT OFFICE.

ARTHUR C. EASTWOOD, OF CLEVELAND, OHIO.

CONTROLLER FOR ELECTRIC MOTORS.

SPECIFICATION forming part of Letters Patent No. 791,886, dated June 6, 1905.

Application filed September 16, 1904. Serial No. 224,709.

*To all whom it may concern:*

Be it known that I, ARTHUR C. EASTWOOD, a citizen of the United States, residing in Cleveland, Ohio, have invented certain Improvements in Controllers for Electric Motors, (Case C,) of which the following is a specification.

My invention relates to means for controlling electric motors employed to drive large pieces of machinery—such, for instance, as printing-presses of large capacity.

One object of the invention is to provide a system by means of which the speed of a motor may be reliably controlled from any one of a number of points at any convenient distance from the motor, and that with a minimum amount of complication.

Another object of the invention is to provide means for preventing the too rapid cutting out of the motor-starting resistance, thereby avoiding abnormal flow of current, as well as excessive mechanical strains, which might prove injurious to the driven machine, such as a complicated printing-press, in which it is essential that all the parts be maintained in proper alinement.

A further object of my invention is to provide means whereby the driving-motor may be stopped in a minimum of time, it being also desired to provide means whereby the motor will be protected from injury by the sudden restoration of current-flow after said current has been interrupted.

These objects I attain as hereinafter set forth, reference being had to the accompanying drawings, in which—

Figure 1:
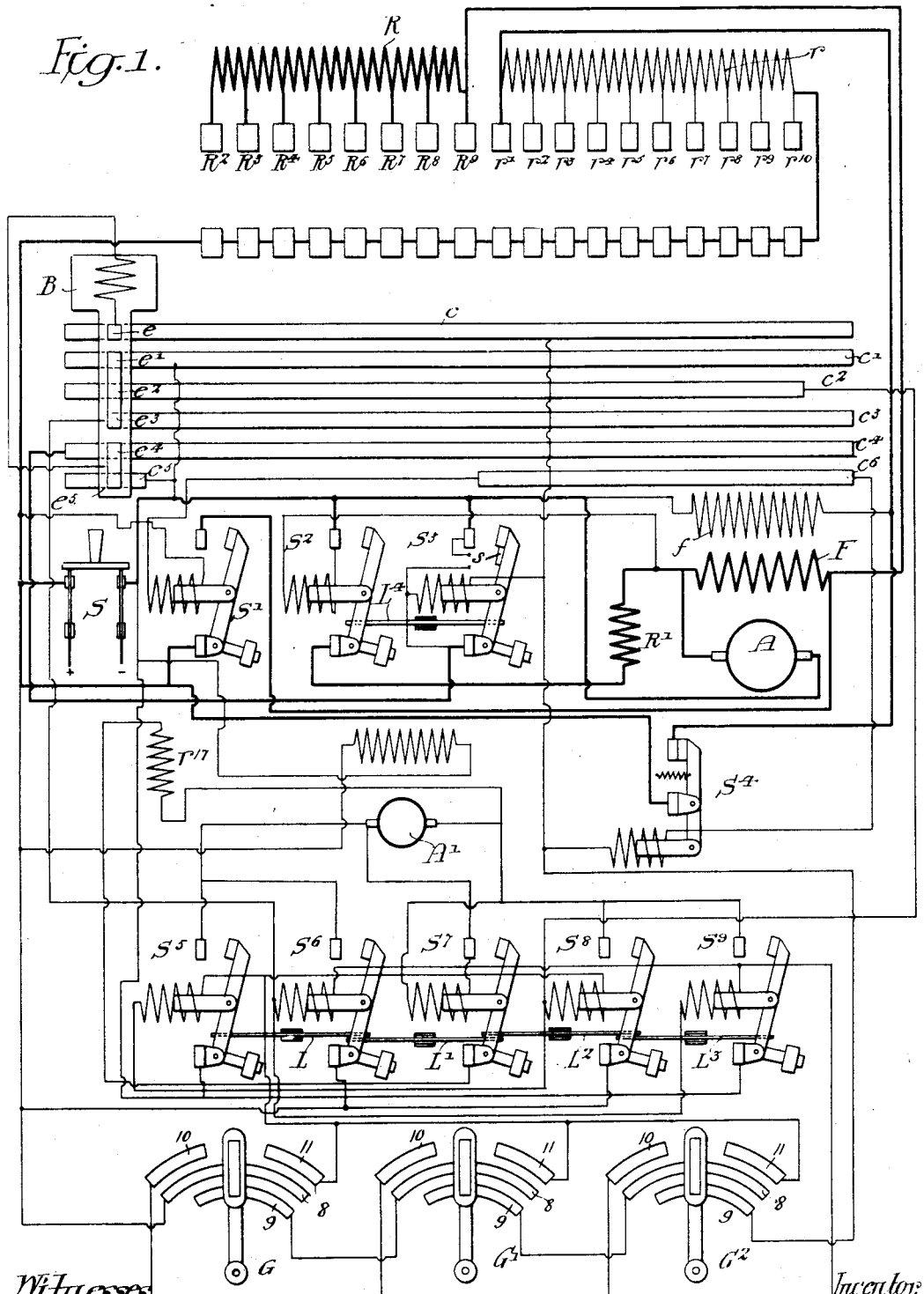
Figure 2:
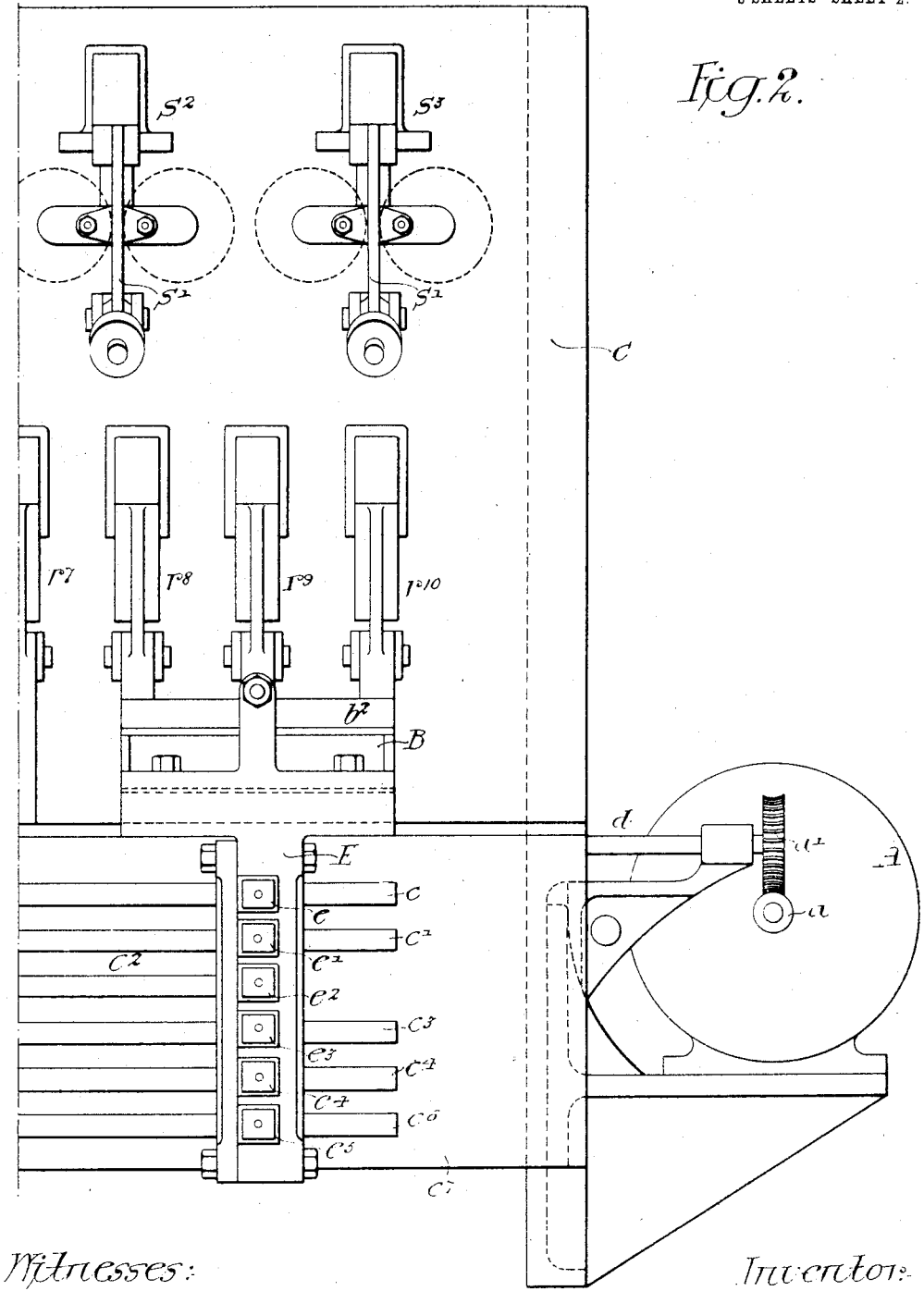

Figure 1 is a diagrammatic view illustrating the apparatus and connections comprising my invention. Fig. 2 is a front elevation of a portion of the switchboard employed in my invention, the same illustrating the arrangement of magnetically-operated switches, as well as the mechanism for operating the same; and Fig. 3 is an end elevation of the switchboard and apparatus illustrated in Fig. 2.

The specific embodiment of my invention comprises a movable magnet for operating in succession and at a predetermined speed a series of switches, whereby resistance in the armature and field circuits of an electric motor may be gradually cut out of or into circuit and the speed of such motor accelerated accordingly. This magnet may be moved in a number of ways, and my invention includes, broadly, any means for moving this magnet back and forth, for cutting out after the motor has started and for cutting in when it is desired to stop the same the resistance placed in the armature-winding, and for cutting in as the speed of the motor is accelerated and cutting out when the motor is to be stopped the field resistance. For the purpose of operating this magnet I mount it in a grooved guideway in front of a bank of switches, forming its base as a nut, through which passes a threaded rod driven by a small motor, by means of which the magnet may be moved back and forth.

In the above drawings, A represents the armature of a relatively large compound-wound motor having a series winding F and a shunt-winding $f$. For controlling the operation of this motor I provide a bank R of armature resistance and a bank $r$ of field resistance, there being also an auxiliary bank of resistance R' designed to be connected in short circuit with the armature when it is desired to bring the motor to a standstill. For controlling the amount of the starting resistance R in circuit I provide a number of switches, in the present instance eight, (indicated by the reference-letters $R^2$ to $R^9$, inclusive,) one terminal of all these switches being connected to a common line in turn connected to a main switch S', while their second terminals are connected to various points on the bank of resistance R. For controlling the amount of the resistance $r$ in circuit with the field-winding of the motor I provide a series of switches $r'$ to $r^{10}$, inclusive, and, as in the case of the above-mentioned armature-resistance switches, the lower terminals are all connected together, while their upper terminals are connected to the various points of the resistance $r$. For controlling the operation of the switches $R^2$ to $R^9$, inclusive, and $r'$ to $r^{10}$, inclusive, I provide a traveling magnet B, whose base is formed to travel in a guideway $b$, suitably supported on standards $b'$, carried by a switchboard C or other suitable means. The base of said magnet B is formed as a nut, through which passes a threaded rod $d$, carried in suitable bearings and driven by a small motor A' through gears $a$ and $a'$.

Figure 3:
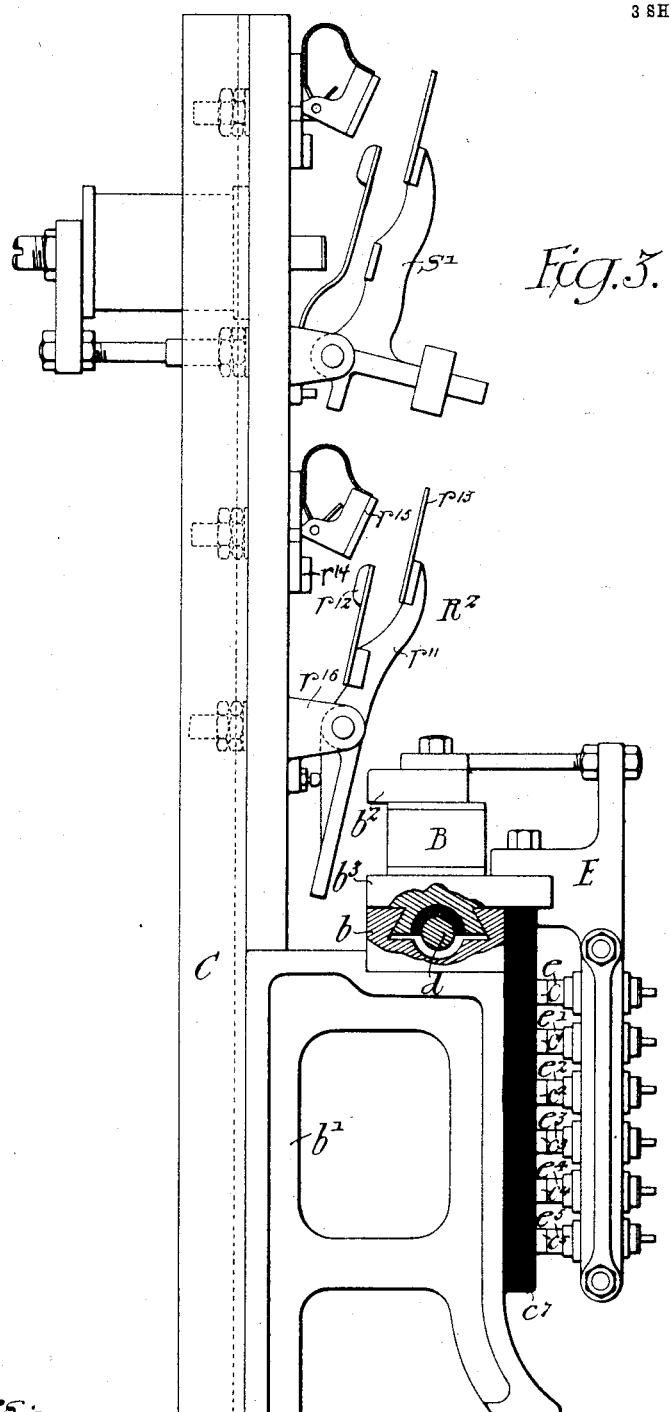

In Figs. 2 and 3 it will be noted that the switch $R^2$, which is typical of all of the switches $R^2$ to $R^9$, inclusive, and $r'$ to $r^{10}$, inclusive, is of such construction that it is normally maintained in an open position, but may be closed when the poles $b^2$ and $b^3$ of the magnet B are brought opposite the pivoted bar $r^{11}$, whose lower portion serves as an armature for said magnet and whose upper part is provided with a main contact $r^{12}$ and an auxiliary contact $r^{13}$ for engagement with fixed contacts $r^{14}$ and $r^{15}$, respectively. These two upper contacts form one terminal of the switch, while the pivotal support $r^{16}$ forms the second terminal.

As will be seen by reference to Fig. 2, the pole-faces of the magnet B are made sufficiently wide to span the armatures of at least two adjacent switches, so that as said magnet travels along the bank of switches it will always maintain one switch at least in a closed position.

Fixed to and traveling with the magnet B is an arm E, carrying in the present instance six contact-brushes $e$ to $e^5$, inclusive, which engage, respectively, with contact-strips $c$ to $c^6$, inclusive, carried upon a plate of insulating material $c^7$, supported on the framework $b'$. It will noted that of these contact-strips the strip $c^2$ does not extend quite to the end of the board, as do the remainder, while the strip $c^3$ is similarly shorter than the remainder of the strips at the opposite end of the board. While the strips $c^5$ and $c^6$ are both in the same line, so as to be engaged at different times by the brush $e^5$, there is a considerable space between them, which, it will be noted, is equal to the space within which the switches $R^2$ and $R^9$ are supported, it being desired that the said brush shall not be brought into engagement with the strip $c^6$ until the magnet has caused operation of all of said switches. From Fig. 1 it will be seen that certain of the brushes $e$ to $e^5$, inclusive, are connected in groups, the brush $e^4$ being connected to the brush $e^5$, the brushes $e'$, $e^2$, and $e^3$ being all connected to each other, and the brush $e$ connected to one end of the winding of the magnet B, whose second end is connected to the two brushes $e^4$ and $e^5$.

$S'$, $S^2$, and $S^3$ are electromagnetic switches provided with means for normally retaining them in their open position, and it will be seen that the coil of the first of these switches is connected between the contact-strip $c^6$ and the positive pole of switch S, while the ends of the coil of switch $S^2$ are connected across the terminals of the motor-armature A. One terminal of the switch $S'$ is connected to the positive pole of the main switch, while its second terminal is connected to the point of junction of the series field-winding F and the end of the bank of resistance R. The switch $S^2$, which is designed to automatically short-circuit the armature A through the resistance $R'$, is connected between the armature - terminals. Switch $S^3$ has one of its terminals connected to that terminal of the armature A which is in connection with the negative pole of switch S, while its second terminal is connected to the contact-strip $c^4$. One end of its actuating-coil is connected to this latter terminal and may be connected to the upper terminal when the switch itself is closed through an auxiliary switch $s$. The opposite end of said coil is connected to contact-strip $c$.

In addition to the three automatic switches above mentioned there is a switch $S^4$, normally maintained in its closed position by a spring or equivalent device and provided with a coil for opening it, which has one end connected to contact-strip $c$ and the other connected to contact-strip $c^6$. The terminals of this switch are respectively connected to the positive terminal of switch S and to the line connecting one end of the shunt field-winding and one end of the field resistance $r$, the second end of said resistance being connected to the lower terminals of all of the switches $R^2$, &c., and $r'$, &c., and from thence to the positive pole of the main switch. The second end of the shunt-field is connected to the negative terminal of the same switch.

For the purpose of controlling from a distance the apparatus heretofore described I provide one or any number (in the present instance three) of controlling-switches G, G', and $G^2$, together with five automatic switches, whereby the small motor A' may be governed. The switches $S^5$, $S^6$, $S^8$, and $S^9$ constitute a reversing device for this motor, while the switch $S^7$, whose actuating-coil is connected across the terminals of the armature of said motor, serves to short-circuit the same through a band of braking resistance $r^{17}$. It will be seen that the construction of the switch G is such that the contact-brush $g$ on its movable arm will when said arm is in a vertical position electrically connect two segments 8 and 9 and will when the arm is moved to the extreme right connect these two segments to a third segment 11. When the arm is moved a short distance toward the left from its central position, its brush connects the two segments 8 and 9 to a fourth segment 10 and when moved to its extreme left-hand position will connect segments 8 and 10 and open circuit-segment 9. It will further be noted that all of the segments 10 are connected together and to one end of the actuating-coil of switches $S^6$ and $S^9$, while the segments 11 are similarly connected to each other and to one end of the coils of switches $S^5$ and $S^8$. The second ends of these latter coils are connected to contact-strip $c^2$, while the second ends of coils of the switches $S^6$ and $S^9$ are connected to contact-strips $c^3$. The segment 8 of switch G is connected to the positive terminal of the main switch S, while segment 9 is connected to segment 8 of switch G'. Segment 9 of this second switch is similarly connected to segment 8 of switch $G^2$, while segment 9 of this last switch is connected to contact-switch $c$. I preferably provide locking-bars L, L', $L^2$, and $L^3$ between the blades of switches $S^5$ to $S^9$, inclusive, in order that but one pair of them or else the short-circuiting switch $S^7$ by itself may be in the closed position at any one time, there being similarly a locking-bar $L^4$ between the blades of switches $S^2$ and $S^3$.

Under operating conditions the closing of the main switch S permits current to flow from it to segment 8 of controlling-switch G through the brush on the contact-arm of this switch to segment 9, and so through controlling-switches G' and $G^2$ to segment 9 of the latter switch. From here the current flows to the actuating-coil of switch $S^3$, to contact-strip $c^4$, through brushes $e^4$ and $e^5$ to contact-strip $c^5$, and from thence to the negative terminal of the main switch. This causes the switch $S^3$ to close, and the negative end of its coil is thereby connected to the negative terminal of the main switch through the auxiliary switch $s$, so that even though the contact-arm E open-circuits the contact-strip $c^5$ the coil of switch $S^3$ will remain energized. It will be seen that the closing of switch $S^3$ permits current to flow from the main switch S through switches G, G', and $G^2$ to contact-strip $c$, contact-brush $e$, magnet B, contact-brush $e^4$, contact-strip $c^4$, switch $S^3$, and so to the negative terminal of the main switch. The energization of the magnet B causes switch $R^2$ to close, thereby completing the circuit from the positive terminal of the main switch through switch $R^2$, armature resistance R, series field-winding F, armature A, and so to the negative terminal of the main switch. Since the switch $S^4$ is normally maintained in its closed position by its weight or spring, as soon as the main switch is closed current will flow through said switch $S^4$ to the shunt field-winding of the motor. If now one of the controlling-switches, as G, has its operating-arm moved toward the right, current will flow from the main switch through segment 8, brush $g$, segment 11 to the coils of switches $S^5$ and $S^8$, and from these coils to contact-strip $c^2$, brushes $e'$ and $e^2$ on contact-arm E to contact-strip $c'$, and thence to the negative terminal of the main switch. As a consequence of this, switches $S^5$ and $S^8$ close, thereby permitting current to flow from the main switch through switch $S^8$, armature of motor A', switch $S^5$, and thence to the negative terminal of the main switch, it being noted that the field-winding of this small motor A' is permanently connected across the terminals of the main switch. The operation of motor A' turns the threaded rod $d$ and causes the magnet B, with its contact-arm E, to travel along the switchboard, thereby causing the switches $R^2$ to $R^9$, inclusive, to successively close, and consequently cut out the resistance R from the armature-circuit of the main motor. By the time the magnet B has caused the switch $R^9$ to close brush $e^5$ has come into contact with the strip $c^6$, with the result that the negative end of the coil of switch S' will be connected to the negative terminal of the main switch, it being noted that the opposite end of this coil is permanently connected to the positive terminal of said main switch. The energization of the coil of switch S' causes it to close, so that the terminal of the armature A will remain in connection with the positive terminal of the main switch, even though magnet B is moved so as to permit the switch $R^9$ to open. It will be further noted that the connection of the contact-strip $c^6$ with the negative terminal of the main switch will result in the energization of the coil of switch $S^4$, which switch will be opened, so that the connection of the shunt-field winding $f$ of the motor to the positive supply-main is completed through switch $r'$, which is similarly closed by the magnet B. As the operation of the motor A' is continued, the various sections of field resistance $r$ are successively cut into circuit by the closing of the switches $r^2$ to $r^{10}$, inclusive, until, finally, when the last switch is closed all of the resistance is in circuit with the shunt-field of the motor, which consequently is operating at full speed. If now the motor A' still continues to operate, the brush $e^2$ moves off of the contact-strip $c^2$, with the result that the coils of switches $S^5$ and $S^8$ are open-circuited and said switches are permitted to open, thereby cutting off current from the small motor, and so stopping further movement of the traveling magnet B. If now the operating-arm of switch G be returned to its vertical position, the condition above noted still continues, although it will be seen that as soon as switches $S^5$ and $S^8$ open the switch $S^7$ closes, owing to the excitation of its coil by the counter electromotive force of the armature of the motor A'. This short-circuits the armature of this motor through the braking resistance $r^{17}$, thereby quickly bringing said motor to a standstill. When the operating-arm of the switch G is moved to the left of its vertical position, the coils of switches $S^6$ and $S^9$ are energized, closing said switches and causing current to be supplied to the motor A' in such a direction as to reverse its rotation, and consequently cause the traveling magnet to be moved toward its "off" position, so as to again successively close, first, switches $r^{10}$ to $r'$, inclusive, and afterward switches $R^9$ to $R^2$, inclusive, slowing down the main motor and finally bringing it to its lowest speed with no resistance $r$ in its field-circuit and all of the resistance R in its armature-circuit, when the brush $e^3$ passes off of the contact-strip $c^3$, and thereby cuts off the current-flow through the coils of switches $S^6$ and $S^9$. Should the operating-arm of the switch G be moved to its extreme left-hand position while the main motor is in operation, the circuits of the magnet B and of the coils of the switches $S'$, $S^3$, and $S^4$ will be opened, thus breaking the circuit of the main motor and allowing the switch $S^2$ to close under the action of its coil, which is constantly energized by the counter electromotive force of the armature A. Said armature is thus short-circuited through the resistance $R'$ and is very quickly brought to a standstill. Since the switch $S^3$ is open, the contact-strip $c^6$ is dead, so that in order to again start the motor it is necessary that the magnet B be moved to the full off position shown in Fig. 1, so that said magnet, as well as coils of switches $S'$ and $S^4$, can be again supplied with current. If while the main motor is in operation the voltage of the supply-circuit should fail, the switch $S^3$ will open, thus opening the circuits of magnet B and of its own coil, as well as the coil of switch $S'$. This permits the braking-switch $S^2$ to close and brings the motor-armature quickly to rest, as above noted. Should the voltage be suddenly restored, the switch $S^3$ will remain open until the magnet B, with its contact-arm E, be returned to its starting position, with the brush $e^5$ in engagement with contact-strip $c^5$, such returning of said traveling magnet being accomplished by moving the operating-arm of any of the switches G, $G'$, or $G^2$ to its extreme left-hand position. This supplies current to the coils of switches $S^6$ and $S^9$, closing said switches and supplying current to motor $A'$ in such a direction that it returns the magnet B to its full off or starting position as required, when the main motor may again be started.

It will be noted that since the rapidity of cutting out the resistance to accelerate the main motor depends on the gearing as well as on the speed of the motor $A'$, said resistance cannot be too quickly cut out, and consequently the said main motor is most completely protected from injury.

While I have shown but three switches, G, $G'$, and $G^2$, for controlling the operation of my system, it is obvious that any desired number may be employed without in any way departing from my invention, the number and location being determined by the convenience of operation.

I claim as my invention—

1. A system for controlling electric motors, the same including a series of switches, apparatus controlled by said switches for governing the current-flow to the motor, and a traveling magnet having means whereby it is moved relatively to the motor controlled, and constructed to act successively upon said switches to operate the same, substantially as described.

2. A system including an electric motor and apparatus for governing the speed of said motor, said apparatus including a traveling magnet, and a series of switches having movable elements placed to be successively actuated by said member, substantially as described.

3. A controlling system for electric motors including current-limiting means, a series of switches for controlling the introduction of said means into circuit, and a traveling magnet for operating said switches, substantially as described.

4. A controlling system for electric motors including a bank of resistance, switches connected to control said resistance and a magnet movable adjacent to said switches for closing the same, substantially as described.

5. A controlling system for electric motors including a plurality of banks of resistance, a plurality of series of switches connected to control the placing of the resistance in circuit, a magnet constructed to successively operate said switches and means for traversing said magnet adjacent to the switches, substantially as described.

6. A controlling system for electric motors including a series of switches, a movable magnet for successively operating said switches, a threaded bar operatively connected to said magnet and means for actuating said bar, substantially as described.

7. A system including an electric motor, controlling resistance for the same, a series of switches governing the amount of the resistance in circuit and a traveling magnet having means whereby it actuates said switches in succession, substantially as described.

8. A controlling system for electric motors including a bank of resistance, a series of normally open switches connected to said resistance, a movable magnet for successively actuating said switches and means for operating said magnet, substantially as described.

9. A controlling system for electric motors including a bank of resistance, switches connected to said resistance, a series of contact-strips, a movable magnet for operating said switches and contacts carried by said magnet in engagement with said contact-strips, substantially as described.

10. A controlling system for electric motors including a bank of resistance, switches connected to govern said resistance including a switch for cutting out the entire bank of resistance, a magnet movable adjacent to said switches, contact-strips, and brushes carried by the magnet in engagement with the contact-strips, substantially as described.

11. A controlling system for electric motors including a main motor, a bank of armature resistance and a bank of field resistance for said motor, switches for controlling said resistance, an auxiliary motor, and a magnet controlled by said auxiliary motor and placed to operate said switches, substantially as described.

12. A controlling system for electric motors including a main motor, armature and field resistance for said motor, switches controlling said resistance, a traveling magnet, and means for traversing said magnet adjacent to the switches to cause their successive operation, substantially as described.

13. A controlling system for electric motors including a motor, two banks of resistance for the same, a magnet, switches for controlling the resistance and arranged to be successively operated by said magnet, a switch for cutting out one bank of resistance after the magnet has passed the switches of the same, a switch for cutting out the other bank of resistance during the progressive cutting out of the first bank, and means for cutting in said second bank of resistance progressively after the first bank has been cut out, substantially as described.

14. A controlling system for electric motors including a bank of resistance, a series of switches for cutting successive sections of the same out of circuit, a switch for cutting out all of the resistance, a traveling magnet for successively actuating said resistance-controlling switches and means for causing the action of said cutting-out switch after the operation of said controlling-switches, substantially as described.

15. A system including an electric motor and apparatus for controlling the speed thereof, the same including a traveling magnet, mechanism actuated thereby, and a plurality of switches for controlling the current-flow to said magnet, substantially as described.

16. A system including an electric motor and apparatus for controlling the speed of said motor, the same including a traveling magnet, apparatus actuated thereby, and an auxiliary motor for moving said magnet, substantially as described.

17. A system including an electric motor and apparatus for controlling the speed of said motor, the same including a traveling magnet, apparatus actuated thereby, and an auxiliary motor for moving said magnet, with means for automatically braking said auxiliary motor when it is disconnected from its source of current-supply, substantially as described.

18. A system including an electric motor and apparatus for controlling the speed of said motor, the same including a traveling member, apparatus actuated thereby, and an auxiliary motor for moving said member, substantially as described.

19. A system including an electric motor and apparatus for controlling the speed of said motor, the same including a traveling member, apparatus actuated by said member, an auxiliary motor for moving the member, and reversing apparatus for said auxiliary motor, substantially as described.

20. A system including an electric motor and apparatus for controlling the speed of said motor, the same including a traveling member, apparatus actuated thereby, an auxiliary motor for moving the member, and means for reversing said auxiliary motor including a plurality of automatic switches, and a switch for governing the action of said automatic switches, substantially as described.

21. A system including an electric motor and apparatus for controlling the operation of said motor including a traveling magnet, mechanism actuated thereby, an auxiliary motor for moving the magnet, and a switch connected to control the current-flow to the magnet and to said auxiliary motor, sustantially as described.

22. A system including an electric motor and apparatus for controlling the operation of said motor including a traveling magnet, mechanism actuated thereby, an auxiliary motor for moving the magnet, and a plurality of switches connected to control the current-flow to the magnet and to said auxiliary motor, substantially as described.

23. A system including an electric motor and apparatus for controlling the operation of said motor including a traveling member, switches actuated thereby, an auxiliary motor for moving said member, and a switch connected to cause the auxiliary motor to operate in one direction when said switch is in one position, and to operate in the opposite direction when the switch is in another position, substantially as described.

24. A system including an electric motor and apparatus for controlling the operation of said motor, the same including a traveling magnet, switches actuated thereby, an auxiliary motor for moving the magnet, a series of automatic switches for controlling the operation of said auxiliary motor, and a hand-operated switch or switches having connections arranged to cause the automatic switches to supply current to operate the auxiliary motor in either direction, either with or without energizing said traveling magnet, substantially as described.

25. A system including an electric motor and apparatus for controlling the operation thereof including a speed-regulating switch or switches, a movable electromagnet constructed to govern the operation of said switch or switches, and a hand-operated switch for controlling the energization of said electromagnet, substantially as described.

26. A system including an electric motor and apparatus for controlling the speed thereof including a bank of resistance, a movable electromagnetic device for controlling the placing of said resistance in circuit, an automatic switch governing the operation of said device, and means for controlling the actuation of said automatic switch, substantially as described.

27. A system including an electric motor, apparatus for controlling the operation thereof, including a series of switches and a movable electromagnetic device for causing the operation of said switches, an automatic switch controlling said device, and a plurality of hand-operated switches connected to govern said automatic switch, substantially as described.

28. A system including an electric motor, a series of resistance-controlling switches therefor, a traveling magnet for operating said switches, and a plurality of hand-operated switches connected to control the operation of the traveling magnet, substantially as described.

29. A system including an electric motor, and means for controlling the operation thereof, including a series of switches connected to vary the current-flow in the motor-circuit, and a bodily-movable device constructed to cause the operation of those of said switches to which it is adjacent while leaving inoperative those switches of the series on both sides of it, substantially as described.

30. A system including an electric motor, armature and field resistance therefor, switches connected to control the amount of said field resistance in circuit, a bodily-movable device for successively operating said switches and automatic apparatus for maintaining the armature-circuit complete while said device is operating on the field-resistance-controlling switches, substantially as described.

31. A system including an electric motor, means for governing the current-flow thereto, a series of switches lying in substantially the same plane for controlling the introduction of said means into circuit, and a bodily-movable device for successively operating said switches, substantially as described.

32. A system including an electric motor, a bank of resistance for controlling the current-flow to the motor, a series of switches arranged in a line for said resistance, a traveling member for operating said switches, and a motor for operating said member, substantially as described.

33. A system including an electric motor, a series of resistance-controlling switches therefor, a series of contact-strips adjacent to said switches, a traveling member for operating the switches, contacts carried by said member and engaging said contact-strips, with apparatus connected to the contact-strips for controlling the operation of said member, substantially as described.

34. A current-controlling system including a bank of resistance and switches connected thereto, a device directly operative upon said switches for actuating the same, a contact-arm carried by said device, a contact-piece engaged by said arm, and means in circuit with said contact piece and arm for governing the operation of the switch-operating device, substantially as described.

35. A current-controlling system including a bank of resistance and switches connected thereto, a movable magnet for actuating said switches, a contact-arm carried by said magnet, a contact strip or strips engaged by said arm, and apparatus in circuit with said contact strip and arm for governing the operation of the magnet, substantially as described.

36. A current-controlling system including a motor, apparatus for governing the current-flow to the motor, a series of longitudinally-extending contact-strips connected to said apparatus, a movable member having a contact or series of contacts in engagement with said strips, an auxiliary motor in circuit with a strip or strips for moving the member, and resistance-controlling switches placed to be operated by said member, with means including a strip or strips arranged to cause the auxiliary motor to become inactive when all of the resistance-controlling switches have been operated, substantially as described.

37. A current-controlling system including a motor, apparatus for governing the current-flow to the motor, a series of longitudinally-extending contact-strips connected to said apparatus, a movable member having a contact or series of contacts in engagement with said strips, and a device carried by said movable member for actuating certain of the apparatus, substantially as described.

38. A controlling system for electric motors including a plurality of banks of resistance, switches for controlling the introduction of resistance into circuit, a switch for cutting out one of the banks of resistance, a traveling member for successively actuating the resistance-controlling switches, and means for causing action of said cutting-out switch after the operation of the controlling-switches belonging to said first bank of resistance, substantially as described.

39. A controlling system for electric motors including a bank of resistance, switches connected to control the introduction of said resistance into circuit, and a device movable adjacent to said switches for causing operation of the same, substantially as described.

40. A system including an electric motor, and apparatus for controlling the current-flow to said motor, said apparatus including a series of resistance-controlling switches, a movable member for causing operation of said switches, an auxiliary motor for moving said member, with means for controlling the operation of said auxiliary motor, the same including a device for quickly stopping said auxiliary motor when its current-supply is cut off, substantially as described.

41. A system including an electric motor, means for controlling the current-flow thereto, switches for governing the introduction of said means into circuit, a traveling member for operating said switches, a motor for moving said member, a series of automatic switches for said auxiliary motor, and a switch for controlling said automatic switches, said apparatus including connections for short-circuiting the auxiliary motor upon itself when it is cut off from the current-supply mains, substantially as described.

42. A system including an electric motor, resistance, switches controlling said resistance, and a traveling member for operating said switches, with a motor for moving said member, automatic switches connected to cause operation of the auxiliary motor in either direction, a switch for short-circuiting said motor upon itself, and a hand-operated device for governing the flow of current through the coils of certain of said switches, substantially as described.

43. The combination of a motor, a bank of resistance, a series of switches connected thereto, a traveling device for actuating said switches, a series of contact-strips extending adjacent to the switches, a series of contact-fingers placed to engage said strips and carried by said traveling member, an auxiliary motor for the traveling member, with means for preventing the starting up of the main motor except when the traveling member is in its starting position, substantially as described.

44. A system including a motor, a series of controlling-switches for the same, a traveling member for causing successive operation of said switches, contacts carried by said member, contact-strips extending adjacent to the switches and engaged by said contacts, an auxiliary motor for operating said traveling member, and an automatic switch connected to shunt certain of the controlling-switches, the same having its actuating-coil in circuit with a contact strip or strips, substantially as described.

45. A system including a series of switches, a series of contact-strips of different lengths, a traveling member for operating the switches, said member being provided with contacts engaging said strips, a motor for moving said traveling member, and automatic controlling-switches for said motor, the coils of said switches being in circuit with contact-strips constructed to open-circuit said coils when the traveling member approaches the ends of its path of motion, substantially as described.

46. A system including a current-actuated device, a series of resistance-controlling switches having a common actuating-coil, apparatus including a hand-operated switch or switches constructed to cause operation of said resistance-switches, and a switch for automatically cutting off current to the coil of the resistance-switches when the voltage of the supply-circuit falls below a predetermined minimum, substantially as described.

47. A system including a motor, a series of switches connected to govern the operation thereof, means for including one of said switches $S^3$, after the motor has been started, in the circuit of another switch $S^4$, and the coil of said first switch having a plurality of lines through which its circuit may be completed, substantially as described.

48. A system including a motor, a series of switches connected to govern the operation thereof, one of said switches being included in the circuit of the coil of another switch, and the coil of said first switch having a plurality of lines through which its circuit may be completed, one of said lines including an auxiliary switch operated by the operation of the first switch, and the other including controlling mechanism for governing the operation of said second switch, substantially as described.

49. A system including a motor, a series of switches connected to govern the operation thereof, one of said switches being included in the circuit of the coil of another switch, and the coil of said first switch having a plurality of lines through which its circuit may be completed, with a switch connected to automatically short-circuit the motor-armature, and means for preventing said first switch and the short-circuiting switch both being in a closed position at the same time, substantially as described.

50. A system including a motor, current-limiting means therefor, a plurality of switches for governing said means, a traveling magnet controlling said switches, and an automatic switch in circuit with the magnet for open-circuiting the same when the voltage of the supply-circuit falls below a predetermined minimum, substantially as described.

51. A system including a motor, current-limiting means therefor, a plurality of switches for governing said means, a traveling magnet controlling said switches, an automatic switch in circuit with the magnet for open-circuiting the same when the voltage of the supply-circuit drops below a predetermined minimum, and a hand-operated controlling switch or switches for said magnet, substantially as described.

52. A system including a motor, current-limiting apparatus therefor including a plurality of switches, a bodily-movable member for operating said switches, an auxiliary motor for moving said member, means for controlling the same, and a circuit including apparatus for automatically short-circuiting the armature of the main motor when the current-flow thereto is cut off, substantially as described.

53. A system including a motor, current-limiting apparatus therefor including a plurality of switches, a bodily-movable member for operating said switches, an auxiliary motor for moving said member, and a circuit including apparatus for automatically short-circuiting the armature of the main motor when the current-flow thereto is cut off, with apparatus for controlling the auxiliary motor including means for automatically short-circuiting it when its supply-circuit is opened, substantially as described.

54. A system including a motor, current-limiting means therefor, switches for governing the introduction of said means into circuit, a switch in shunt to said first switches, and means for automatically causing operation of said shunt-switch when said current-limiting means has been cut out, substantially as described.

55. A system including a motor, armature and field resistance therefor, switches for governing the placing of said resistance in circuit, a device for automatically operating said switches, a switch in shunt to the armature resistance, and means actuated by said switch-operating device for causing operation of said shunt-switch when the armature resistance has been cut out, substantially as described.

56. A system including a motor, armature and field resistance therefor, switches for governing the placing of said resistance in circuit, switches respectively in shunt to said two bodies of resistance, with automatic means for causing closing of one of the shunt-switches and opening of the other when the armature resistance has been cut out, substantially as described.

57. A system including a motor, armature and field resistance therefor, switches for governing the placing of said resistance in circuit, a traveling device for operating said switches, and means for moving the device to first operate switches to cut out the armature resistance and afterward to cut in the field resistance, substantially as described.

58. A system including a motor, current-limiting means therefor, switches for governing the placing of said means in circuit, a device for operating said switches, other switches for governing the current-flow to the motor, and a controller operated by said switch-operating device for governing the action of said latter switches, substantially as described.

59. A system including a motor, current-limiting means therefor, switches for governing the placing of said means in circuit, a traveling member for operating said switches, other switches for governing the current-flow to the motor, and a controller operated by said traveling member for governing the action of said latter switches, substantially as described.

60. A system including a motor, current-limiting means therefor, switches for governing the placing of said means in circuit, a device for operating said switches, a controller actuated by said device, an auxiliary motor for moving the device, and apparatus for automatically braking said auxiliary motor when said switch-operating device operates the controller to a predetermined point or points, substantially as described.

61. A system including a motor, current-limiting means therefor, switches for governing the placing of said means in circuit, a device for actuating said switches, a controller actuated by said device, an auxiliary motor for moving the device, apparatus for automatically braking said auxiliary motor when said switch-actuating device operates the controller to a predetermined point or points, and hand-operated means for controlling said auxiliary motor, substantially as described.

62. A system including a motor, a hand-operated switch or switches for controlling the operation thereof, current-limiting means for the motor, switches for said means, a device for actuating said switches, and apparatus controlled by said hand-operated switch or switches including connections such that in one position of said latter switch the switch-actuating device operates to cause positive acceleration of the motor, in a second position causes negative acceleration of the motor, and in a third position operates said device toward its starting position with the motor on open circuit, substantially as described.

63. A system including a motor, a hand-operated switch for controlling the same, current-limiting means for the motor, switches for said means, a traveling magnet for actuating said switches and an auxiliary motor controlled by the hand-operated switch for moving the magnet, said hand-switch, the auxiliary motor and the magnet being connected so that in one position of said switch the auxiliary motor moves the magnet in a direction to cause positive acceleration of the main motor, in another position of the switch the auxiliary motor moves the magnet in a direction to cause negative acceleration, and in a third position open-circuits the magnet and causes the auxiliary motor to move the magnet to its starting position, substantially as described.

In testimony whereof I have signed my name to this specification in the presence of two subscribing witnesses.

ARTHUR C. EASTWOOD.

Witnesses:
WILLIAM F. BEATON,
MURRAY C. BOYER.